United States Patent
Breuer et al.

(10) Patent No.: US 9,877,140 B2
(45) Date of Patent: Jan. 23, 2018

(54) DISTRIBUTED INITIALIZATION OF M2M ACCESS TO RADIO ACCESS NETWORK

(71) Applicant: GEMALTO M2M GMBH, München (DE)

(72) Inventors: Volker Breuer, Bötzow (DE); Frank Westerkowsky, Berlin (DE); Jörg Rook, Berlin (DE)

(73) Assignee: GEMALTO M2M GMBH, Munich (DE)

( * ) Notice: Subject to any disclaimer, the term of this patent is extended or adjusted under 35 U.S.C. 154(b) by 58 days.

(21) Appl. No.: 14/376,258

(22) PCT Filed: Feb. 4, 2013

(86) PCT No.: PCT/EP2013/052147
§ 371 (c)(1),
(2) Date: Aug. 1, 2014

(87) PCT Pub. No.: WO2013/113923
PCT Pub. Date: Aug. 8, 2013

(65) Prior Publication Data
US 2015/0003366 A1    Jan. 1, 2015

(30) Foreign Application Priority Data
Feb. 3, 2012 (EP) .................................... 12153940

(51) Int. Cl.
*H04W 4/00* (2009.01)
*H04W 4/08* (2009.01)
(Continued)

(52) U.S. Cl.
CPC ............ *H04W 4/005* (2013.01); *G08C 17/02* (2013.01); *H04W 4/001* (2013.01); *H04W 4/006* (2013.01);
(Continued)

(58) Field of Classification Search
CPC ..... H04W 4/005; H04W 84/18; H04W 74/04; H04W 4/006; H04W 8/245; H04W 72/12;
(Continued)

(56) References Cited

U.S. PATENT DOCUMENTS

2007/0218894 A1* 9/2007 Harris et al. ............... 455/426.1
2010/0146117 A1 6/2010 Hoeksel
(Continued)

FOREIGN PATENT DOCUMENTS

EP 2 373 110 A2 10/2011
EP 2 400 734 A2 12/2011

OTHER PUBLICATIONS

International Search Report (PCT/ISA/210) dated Aug. 6, 2013, by the European Patent Office as the International Searching Authority for International Application No. PCT/EP2013/052147.
(Continued)

*Primary Examiner* — Obaidul Huq
(74) *Attorney, Agent, or Firm* — Buchanan Ingersoll & Rooney PC

(57) ABSTRACT

A radio device, comprising an application scheduling unit configured to initiate a transmission of application output data in communication with a radio access network in accordance with a predetermined application transmission schedule determining at least one allowed time, which is a time span or a point in time, for the communication of the application output data. The allowed time depends on a parameter value of a set of at least one parameter that is allocated to the radio device and that is suitable for distinguishing the radio device from at least one other radio device of a group of radio devices to which the radio device belongs. A communication unit is configured to transmit the application output data in communication with the radio access network in the form of radio signals and at a time that
(Continued)

is in accordance with the predetermined transmission schedule.

14 Claims, 7 Drawing Sheets

(51) Int. Cl.
- *H04W 72/12* (2009.01)
- *G08C 17/02* (2006.01)
- *H04W 8/24* (2009.01)
- *H04W 74/04* (2009.01)

(52) U.S. Cl.
CPC ............. *H04W 4/08* (2013.01); *H04W 8/245* (2013.01); *H04W 72/12* (2013.01); *H04W 74/04* (2013.01); *G08C 2201/21* (2013.01)

(58) Field of Classification Search
CPC ........ H04W 4/08; H04W 4/001; G08C 17/02; G08C 2201/21; H04L 67/1044
USPC ....... 370/229, 230, 231, 235, 310, 328, 329, 370/338, 351, 389, 395.1, 395.2, 395.4; 455/403, 418, 419, 420, 422.1
See application file for complete search history.

(56) References Cited

U.S. PATENT DOCUMENTS

| | | | |
|---|---|---|---|
| 2011/0199905 A1* | 8/2011 | Pinheiro et al. | 370/235 |
| 2011/0201267 A1* | 8/2011 | Synnergren | H04W 4/00 455/3.01 |
| 2013/0003583 A1* | 1/2013 | Landstrom et al. | 370/252 |
| 2013/0016666 A1* | 1/2013 | Chen | H04W 72/1231 370/329 |
| 2014/0056193 A1* | 2/2014 | Huang | H04W 4/005 370/311 |
| 2014/0073367 A1* | 3/2014 | Chou | 455/466 |

OTHER PUBLICATIONS

Written Opinion (PCT/ISA/237) dated Aug. 6, 2013, by the European Patent Office as the International Searching Authority for International Application No. PCT/EP2013/052147.

* cited by examiner

FIG. 4a -PRIOR ART-

DISTRIBUTED INITIALIZATION OF M2M ACCESS TO RADIO ACCESS NETWORK

The present invention relates to a radio device, which is configured to initiate a transmission of application output data in communication with a radio access network in accordance with a predetermined application transmission schedule. The invention is further related to a controller device for controlling traffic of application output data transmitted from a predefined group of radio devices to an application server via a radio access network. The invention further concerns a method for operating a radio device and a method for operating a controller device of the mentioned kinds. Finally, the invention concerns computer program products related to the methods of the present invention.

The invention is in the field of machine-to-machine (M2M) communication. M2M communication is performed via communication networks of limited capacity, such as radio access networks. A first machine performs a specific application function and transmits application output data related to this application function to a second machine. This second machine processes the received application output data in order to perform other functions, which may for instance be control or monitoring of the first machine.

Without loss of generalization, the present specification will refer to the specific application function of the first machine, and thus to the first machine itself, simply as an application device or application. The data provided by the application will be referred to as application output data. The second machine will hereinafter also be referred to as an application server, without implying performance of other functions than receiving and processing the application output data. An example of an application is an electrical meter that measures a consumption of energy in a consumer household. For enabling M2M communication, such an electrical meter may comprise a radio device for the transmission of the measured energy consumption data to an application server of a central system of an energy provider. In the art, this type of advanced metering infrastructure is often referred to as a "smart meter". Smart meters may not only provide one type of application output data such as the mentioned example of energy consumption. Other types of application output data of a smart meter may comprise information on a status of the meter device, on a power outage, or other state information regarding the monitored physical quantity.

Currently, the number of installed smart meters is low enough to be accommodated by the capacity of existing radio access network infrastructure. However, with an expected increase in the number of M2M applications that use communication via radio access networks, the transmission capacity provided by the radio access networks may become increasingly used by M2M devices, thus increasing the chances of insufficient capacity or decrease in quality of service delivered for transmissions other than M2M, such as speech and Internet traffic. For instance, mobile telephone users may not be able to access a radio access network in moments of peak usage by M2M applications. In summary, congestion is expected to become a major problem as the number of smart metering devices using data communication via radio access networks increases.

It is therefore an object of the present invention to provide a radio device that helps avoiding congestion in radio access networks. It is another object of the present invention to provide a controller device for controlling traffic of application output data transmitted from a predefined group of radio devices to an application server in a radio access network that helps avoiding traffic congestion. Further objects of the present invention relate to methods for operating a radio device and a controller device of the mentioned type that help avoiding traffic congestion in a radio access network.

According to a first aspect of the present invention, a radio device is provided that comprises an application scheduling unit, which is configured to initiate a radio network access for a transmission of application output data in communication with a radio access network in accordance with a predetermined application transmission schedule determining at least one allowed time, which is a time span or a point in time and defined in terms of a week, a day or a time of day, for the communication of the application output data, wherein the allowed time depends on a parameter value of a set of at least one parameter that is allocated to the radio device and that is suitable for distinguishing the radio device from at least one other radio device of a group of radio devices to which the radio device belongs, and comprising a communication unit, which is configured to either transmit or receive the application output data in communication with the radio access network in the form of radio signals and at a time that is in accordance with the predetermined application transmission schedule.

The radio device of the first aspect of the present invention is distinguished from known radio devices by its application scheduling unit. The application scheduling unit controls the initiation of transmissions of application output data in communication with a radio access network. The application scheduling unit operates on the basis of a predetermined application transmission schedule, which is managed locally within the radio device. The application transmission schedule applies to application output data that, in operation of the radio device, are provided by an application unit. However, for clarification it is noted that the radio device is in some embodiments provided without an application unit, but with the application scheduling unit. For instance, an application unit may be formed by a meter to be connected with the radio device. The radio device may in this case be delivered to a manufacturer of the meter, which combines the meter and the radio device to form an application device.

The radio device of the present invention is based on the recognition that M2M communication, in many application scenarios, is less time critical and may be distributed in time. By virtue of the application scheduling unit, the radio device of the first aspect of the present invention allows achieving a controlled broad distribution of transmission times over a group of application devices employing the radio device of the present invention. With a broad distribution of transmission times, peak usage of the available transmission capacity of a radio access network can be avoided. This way, the usage of the transmission capacity of the radio access network can be optimized to accommodate as many transmission events as possible in view of the transmission capacity of the radio access network integrated over time.

The application scheduling unit of the radio device is configured to control the initiation of a transmission of application output data on the basis of an application transmission schedule determining one or more allowed times. An allowed time, in accordance with the present invention is a time span or a point in time. As a time span, the allowed time is defined in terms of a week, a day or a time of day. The term time of day is to be understood as defining either at least one time span within a day, or at least one point in time during a day. Only during the allowed time a transmission of the application output data is allowed by the application scheduling unit. In order to achieve the broad distribution of times, during which different radio devices initiate a transmission of application output data via the radio access network, the allowed time depends on a parameter value of a set of at least one parameter that is allocated to the radio device and that is suitable for distinguishing the radio device from at least one other radio device of a group of radio devices, to which the subject radio device belongs. Accordingly, instead of an approach that requires individually assigning respective allowed times to the radio devices, the radio device of the present invention makes use of differences that already exist between the radio devices, namely, differences in parameter values allocated to the radio device. In general, one parameter value that allows distinguishing between different radio devices is sufficient to perform the invention. However, as will be described further below in the context of the description of embodiments of the invention, more than one distinguishing parameter may be used to achieve further advantageous effects.

It is noted that the transmission of application output data may comprise a download of data, available for instance for download to the radio device from an application server, such as regular firmware updates, content updates like maps, ephemerides for an assisted global position system (AGPS) etc. It is one of the advantages of the present invention that is allows avoiding congestion due to all radio devices accessing the application server at the same time to download such data.

In the following, embodiments of the radio device of the present invention will be described. The additional features of the radio device in its different embodiments may be combined with each other to obtain further embodiments of the radio device.

The application scheduling unit may be provided as a hardware unit with dedicated circuitry. In another embodiment, it is implemented by means of a programmable microprocessor and a corresponding executable software unit. The application scheduling unit may be for instance provided as a functional unit of an operating system that is installed on the radio device for control of its operation. In another embodiment, the application scheduling unit is a software unit that is separate from the operating system and installable on top of the operating system as a part of an application layer functionality of the radio device.

As already apparent from the discussion above, the allowed time may in different embodiments depend on either one or at least two different parameters.

Within this framework, there are several different embodiments that make use of different sets of at least one parameter for distinguishing the radio device from at least another radio device of a group of radio devices. As mentioned before, the different options for selecting a parameter may be combined with each other. In one embodiment the set of at least one parameter comprises a group identifier, which identifies a group of radio devices, to which the subject radio device belongs. In this embodiment, a set of radio devices implementing an application and initiating transmissions of application output data via the radio access network are grouped. Accordingly, the allowed times for initiating the transmissions are also grouped, thus achieving a distribution of application output data transmissions over time. Such a group identifier may for instance be implemented as a simple numerical identifier, distinguishing for instance between group 1, group 2, and so on.

In another embodiment that may be used in addition or as an alternative to the using of group identifier, the set of at least one parameter comprises a parameter that is variable as a function of time and takes on different parameter values at different points in time. In this embodiment, the application scheduling unit is configured to re-determine the application transmission schedule upon a change of the parameter value using the respective currently valid parameter value. The radio device of this embodiment achieves the advantage of a dynamic scheduling of the transmission of application output data. The scheduling is adapted in dependence on a parameter that changes in time. This way, the scheduling may be adapted in accordance with a current state of the radio device or with a state of the radio access network that is reflected in a parameter assigned to the radio device.

As a simple example, a network entity may request an application device to start its transmission of application output data at a start time of, e.g., $$\text{start\_time} + X \text{ seconds} \cdot [\text{serial\_number mod Y}],$$

wherein start_time refers to a start time of the transmission of application output data in terms of time of the day, X is a parameter indicative of a number of seconds, serial_number is an individual serial number of the application device, e.g. a power meter, and mod Y refers to the well known modulo function with respect to a number Y. For instance, given the formula above, if start_time is 01:00 a.m, that is, one o'clock in the morning, X is set to 4, and Y is set to 3, an application device with a serial number 00001 starts its transmission at 01:00 a.m.+4 seconds, because 00001 mod 3=1 mod 3=1. For an application device with a serial number 00002 the transmission will start at 1 a.m.+8 seconds, (00002 mod 3=2), while an application device with a serial number 00003 will start the transmission at 1 a.m.+0 seconds (0003 mod 3=0).

In different variants of this embodiment, the application devices are grouped into smaller or larger groups by choosing the appropriate modulo function.

A further separation or staggering in time is achieved by letting the parameter X, depend on a current network status. For instance, at times of high network traffic, as defined by a threshold of a measurable parameter, X may be assigned a predefined high value. On the other hand, at times of traffic below the threshold, X may be selected to have a predefined small value. The parameters X, Y and also the starting time are parameters provided by network and especially the starting time and value X may be varied by actual network conditions.

In another embodiment, the set of at least one parameter comprises a mathematical or physical quantity allowing an unambiguous identification of the radio device. Such a mathematical quantity is for instance any type of unique identification number, such as the International Mobile Equipment Identity (IMEI) allocated to the radio device. The IMEI is a unique serial number allowing an unambiguous identification of a terminal device operating in accordance with a known standard such as GSM or UMTS. Another example is an identifier or contract number, for instance of a metering device attached to the radio device. An example of a physical quantity used as a parameter is measured data like a meter reading, or a representation of location information like coordinate data. Further derived information form possible variants, like a checksum or hashcode created from the physical or mathematical quantity.

A further embodiment of the radio device comprises a receiving unit which is configured to receive radio signals in communication with the radio access network. The receiving unit is preferably configured to receive at least one parameter value of the set of at least one parameter, via a network node of the radio access network. The radio device of this embodiment enables a setting of the parameter value that is used in scheduling the transmission of the application output data from an external entity, as will be described in more detail in the context of the second aspect of the present invention.

In another embodiment, the set of at least one parameter additionally comprises a load parameter, which is indicative of a current (and thus variable) condition of the radio access network or of an application server. The additional use of the load parameter allows adapting the application transmission schedule in view of the current load condition. For instance, a current overload condition of the radio access network can be communicated this way and accommodated by adapting the application transmission schedules of the radio devices that use the network, such that a detected time of overload is avoided for the purpose of transmission of the application output data. Such a condition may for instance be present in a cell of the radio access network during certain times of the day. With the present embodiment, a scheduled transmission may be rescheduled to take place at less busy times, for instance during night hours, when speech and internet traffic is generally low. The application scheduling unit of the radio device is to this end preferably configured to re-determine the application transmission schedule upon receiving a new current value of the net parameter.

In a preferred embodiment, the application scheduling unit is configured to determine the application transmission schedule by calculating the at least allowed time according to a predetermined schedule-calculation rule that uses the parameter value of the at least one parameter allocated to the radio device as a calculation input parameter. In this embodiment, the application transmission schedule is determined by the application scheduling unit itself on the basis of the predetermined schedule-calculation rule. The schedule-calculation rule may for instance be provided in the form of an equation or a mathematical term including the parameter that distinguishes the radio device from at least one other radio device of the group of radio devices, to which the subject radio device belongs. The provision of a predetermined schedule-calculation rule is particularly efficient because it avoids the transmission or storage of tables or other listings of allowed times and enables the radio device to determine the application transmission schedule without further input from other devices.

More than one predetermined schedule-calculation rule may be stored in the radio device or in an application unit communicating with the radio device, in order to allow a selection in the sense of an adaptation of the application transmission schedule to conditions varying in time. As mentioned before, another way of such adaptation can be implemented by using just one schedule-calculation rule by using input parameters that may vary with time, and re-calculation of the application transmission schedule.

Communication of application output data is in many embodiments performed from the radio device. However, the invention also concerns embodiment, in which the communication of application output data is alternatively or additionally performed to the radio device. As an example of communication of application output data to the radio device, the radio device may be configured to check, in accordance with the application transmission schedule, with assigned remote servers for an update of certain data, such as a firmware, or an update on schedule-calculation rules. Embodiments of the radio device thus additionally comprise a receiving unit, which is configured to receive radio signals in communication with the radio access network.

The receiving unit of these embodiments is preferably additionally configured to receive the schedule-calculation rule and forward it internally for storing it inside the radio device. This embodiment has the advantage of allowing an adaptation of the schedule-calculation rule on the network or application server side. It is considered useful to provide a number of schedule-calculation rules initially to the radio device and to later provide selection signals that instruct the radio device to select a specific schedule-calculation rule from the set of rules stored.

In a further embodiment, the set of the at least one parameter additionally comprises a scheduling parameter, which is indicative of a time constraint that further constrains the allowed time for the transmission of the application output data. The scheduling parameter may for instance define at least one certain time span, during which a transmission has to be made, or block other time spans expressly from use for the transmission of application output data. The scheduling parameter may therefore be used to define boundary conditions for a scheduling rule that would provide more scheduling flexibility if only the other parameter(s) were used for determining the application transmission schedule, that is, the other parameters which is (are) suitable for distinguishing the radio device from at least one other radio device of a group of radio devices to which the radio device belongs.

As mentioned before, the radio device of the present invention may be used in the hardware context of an application device. In particular, it may form an integral part of the application device, for instance in the form of a radio module that is connected with an application module. Generally, thus, preferred embodiments of the radio device further comprise an application unit, which is connected with the application scheduling unit and which is configured to generate the application output data. Examples of application units are abundant, and comprise, generally speaking, metering devices for measuring a physical quantity and/or transformer devices for transforming all kinds of signals or data.

Several possibilities exist for storing the information that is required to implement the operation under the application transmission schedule. The radio device itself in one embodiment further comprises a memory for storing the parameter value of the at least one parameter allocated to the radio device, or the schedule-calculation rule, or both. The memory may in different embodiments be a part of a subscriber identity module present in the radio device. Herein, the term subscriber identity module is used without restriction to a particular standard of mobile telecommunication. By way of example, it is meant to comprise implementations as a USIM for 3G radio communication, or as a component SIM, or any other identification module that can be used for user identification and authentication purposes. In other embodiments, the memory for storing the parameter value is arranged in another part of the radio device, such as a part of a chipset or as an integrated part of a system on chip (SoC) or of a system in package (SiP). The memory may also be arranged outside the radio device in an application unit.

In accordance with a second aspect of the invention a controller device for controlling traffic of application output data transmitted from a predefined group of radio devices to an application server in a radio access network is provided. The controller device comprises a scheduling unit, which is configured to determine respective parameter values of a set of at least one parameter to be allocated to the radio devices of the group for use in determining an application transmission schedule or to determine at least one schedule-calculation rule that uses the parameter values of the set of at least one parameter allocated to the radio device as a calculation input parameter for calculating the application transmission schedule. The application transmission schedule determines at least one allowed time, which is a time span or a point in time and defined in terms of a week, a day or a time of day, for the transmission of the application output data, the allowed time depending on the parameter value of a set of at least one parameter that is allocated to the respective radio device of the group and that is suitable for distinguishing the radio device from at least one other radio device of the group. The controller device further comprises an output unit, which is configured to provide the parameter values or the at least one schedule-calculation rule for transmission to the group of radio devices attached to the radio access network.

The controller device forms an optional complementary counterpart to the radio device of the first aspect of the invention in certain embodiments. It may be used to provide the radio devices of the group of radio devices with respective application transmission schedules. Advantages of the controller device of the second aspect of the invention correspond to those of the radio device of the first aspect of the invention and, for reasons of brevity, shall not be repeated here.

In the following, embodiments of the controller device will be described. As before, embodiments may be combined to obtain further embodiments.

Generally, the controller device for controlling the traffic of application output data may be implemented as an entity, which is entirely separate from the application server that is associated with the group of application devices. As an example for this case, the controller device is in one embodiment associated with an network operator and forms a part of the transmission infrastructure, for instance of a radio access network, which is used in the context of the transmission of the application output data from the application device to the application server. The controller device can be operated even without a communication link to the application server.

The controller device is in different embodiments implemented as a stand-alone hardware with dedicated circuitry, as a hardware module for integration into another hardware device, or as a hardware device operating a programmable processor that executes a software program, which implements the controller device. In the latter embodiment, the controller device may form one of a number of functional units. As an example of the latter embodiment, and as an alternative to the above embodiment for use in a transmission infrastructure, the controller device may be connected with or integrated into an application server that also receives and processes the application output data and may perform additional control functions with respect to the associated group of radio devices. In contrast to the above-mentioned association with a network infrastructure provider, the controller device may thus be associated with a provider of an application, such as a provider of electricity, gas, water, information, media, or of services of any other kind. This allows achieving a load control on the side of the application server. In other words, a distribution of transmission times of associated radio devices for application output data can be set by a proper determination on the application server side, and by distributing the respective application transmission schedules to the associated radio devices, so as to avoid a reception overload or a processing overload on the side of the application server during operation.

In one embodiment, the controller device further comprises an overload detection unit, which is configured to detect an overload condition at the application server or in the radio access network in accordance with at least one predefined overload criterion and, upon detecting the overload condition, provide at its output an indicator of the presence of the overload condition, wherein the scheduling unit is configured to receive the indicator provided by the overload detection unit and is configured to generate and provide at its output overload control information instructing the radio devices, which are member of the group, to modify the application transmission schedule by selecting a different application transmission schedule or by modifying at least one of the parameter values of the respective set of at least one parameter that is allocated to the respective radio devices.

In another embodiment, the application scheduling unit is configured to assign a unitary schedule-calculation rule to all radio devices of the group. In a variant, a structure of groups comprising sub-groups of radio devices may be implemented by the setting and distribution of application transmission schedules to associated radio devices. For instance, larger numbers of radio devices can be controlled this way in their transmission of application output data.

In accordance with a third aspect of the invention, a method for operating a radio device is provided. The method comprises initiating a transmission of application output data in communication with a radio access network in accordance with a predetermined application transmission schedule determining at least one allowed time, which is a time span or a point in time and defined in terms of a week, a day or a time of day, for the transmission of the application output data, wherein the allowed time depends on a parameter value of a set of at least one parameter that is allocated to the radio device and that is suitable for distinguishing the radio device from at least one other radio device of a group of radio devices to which the radio device belongs, and transmitting the application output data in communication with the radio access network in the form of radio signals and in accordance with the predetermined transmission schedule.

The method of the present aspect of the invention shares the advantages of the radio device of the first aspect of the invention. Embodiments of the method comprise steps that are performed in accordance with the functionality described herein for the various embodiments of the radio device of the invention.

In accordance with a fourth aspect of the invention, a method for operating a controller device in controlling operation of a group of radio devices is provided. The method comprises scheduling a transmission of application output data from the group of radio devices to an application server via a radio access network, wherein the scheduling comprises providing all radio devices of the group with a predetermined application transmission schedule determining at least one allowed time, which is a time span or a point in time and defined in terms of a week, a day or a time of day, for the transmission of the application output data, wherein the respective allowed time depends on a parameter value of a set of at least one parameter that is allocated to the individual radio devices of the group.

The method shares the advantages of the controller device of the second aspect of the invention. Embodiments of the method comprise steps that are performed in accordance with the functionality described herein for the various embodiments of the controller device of the invention.

Further aspects of the present invention relate to computer programs. One aspect is a computer program comprising executable code suitable for controlling operation of a radio device in accordance with a method of the third aspect of the invention or one of its embodiments when executed by a processor of the radio device. Another computer program aspect is a computer program comprising executable codes suitable for controlling operation of a controller device in controlling operation of a group of radio device in accordance with a method of the fourth aspect of the invention when executed by a processor of the controller device. The computer programs each are typically provided on a storage medium.

In the following, further embodiments of the various aspects of the invention will be described with reference to the enclosed drawings. In the drawings, FIG. 1 shows a schematic block diagram of an embodiment of a radio device according to the first aspect of the invention.

FIG. 2 shows a schematic block diagram of a method for operating the radio device 100.

FIG. 3a) to c) show illustrations of application transmission schedules in accordance with different embodiments.

FIG. 4a) and b) visualizes this effect by two schematic drawings showing the usage of a transmission capacity of a cell of a radio access network as a function of time over a full day FIG. 5 shows a schematic illustration of a radio access network infrastructure employing the present invention.

Figure 1:
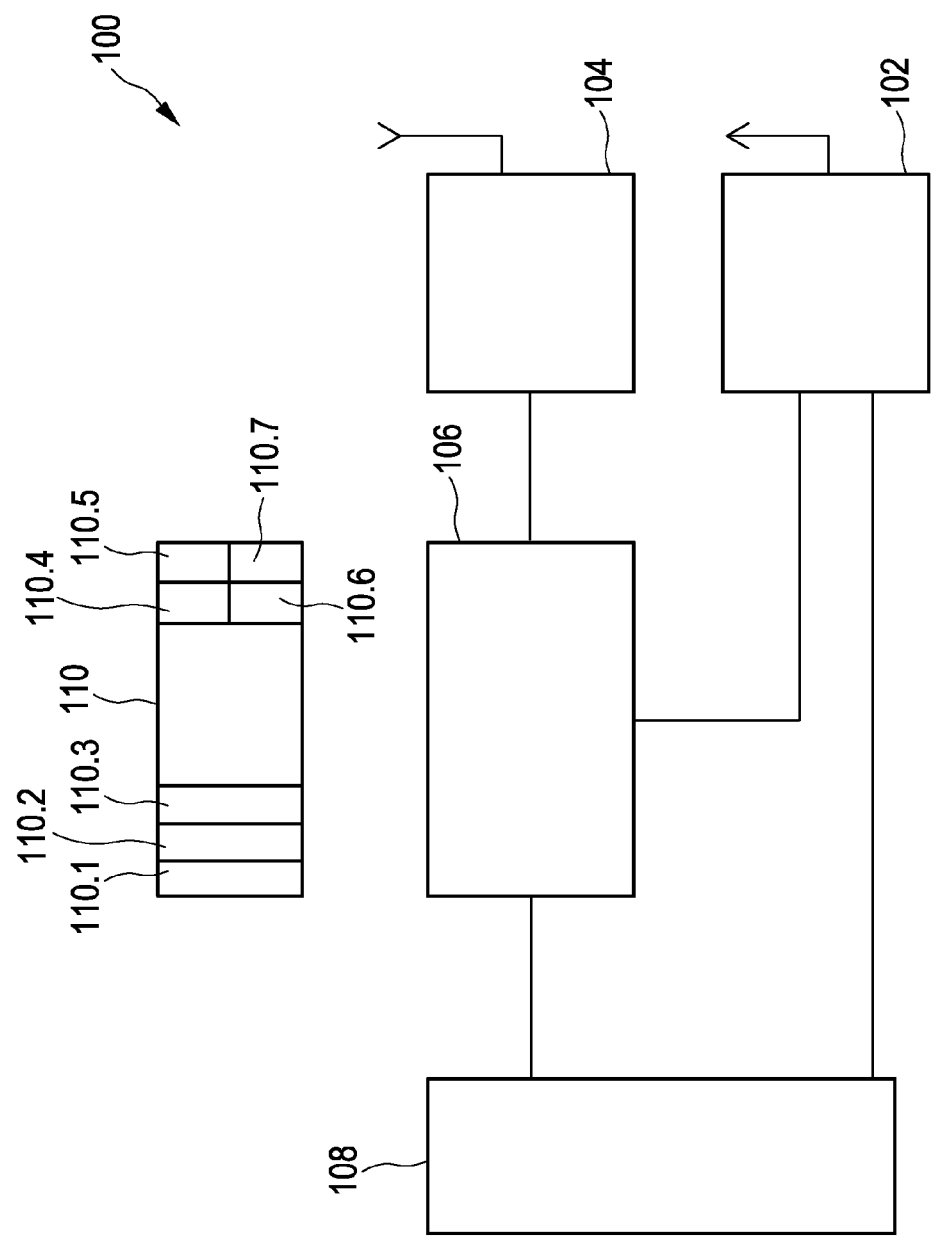

FIG. 1 is a schematic block diagram of a radio device 100 in accordance with an embodiment of the present invention. The radio device comprises a communication unit comprising transmission unit 102 and a receiver unit 104 for exchanging radio signals with a radio access network infrastructure in accordance with a known radio telecommunication standard. By way of example, the transmission and receiver units 102 and 104 may operate in accordance with a GSM, UMTS, and/or LTE standard, without excluding compatibility with any other standard of radio telecommunication used anywhere in the world. The transmission and receiver units 102 and 104 may for instance be implemented in the form of a radio module, that is, a hardware unit that implements all baseband and RF functionalities required for communicating with a radio access network.

The radio device 100 further comprises an application scheduling unit. The application scheduling unit 106 may be integrated into a radio module comprising the transmission and receiver units 102 and 104. In another embodiment the application scheduling unit is provided on a separate piece of hardware, which comprises an application unit 108. The application unit, as mentioned in the introductory part of the present specification, may be any type of signal or data processing device that generates application output data which are to be transmitted to an external application server via the transmission unit 102. The radio device 100 further comprises a memory 110 that is connected with the receiver unit 104 and the application scheduling unit 106. Further connections are of course possible in accordance with the technical requirements of the radio device. However, they are not shown for reasons of simplicity of the block diagram and of the present description. The memory comprises memory areas 110.1 to 110.3, which comprise data determining three different application transmission schedules. Furthermore, the memory comprises memory regions 110.4 to 110.7 comprising a set of parameters assigned to the radio device. The aforementioned number of application transmission schedules and parameters are merely exemplary and may differ from other embodiment used for implementation in the field. However, at least one application transmission schedule and at least one parameter is stored in the memory 110.

The application transmission schedule may be stored in different ways. In one example, the application transmission schedule is organized as a list of allowed times. The allowed times may define a calendar week, a calendar day or at least one time of day, depending on the requirements of the specific application implemented. Some applications may require a transmission of application output data at a rather low rate in terms of weeks only, while others may require much more frequent transmissions of application output data, for instance on an hourly basis. Examples of application transmission schedules will be given further below. The set of parameters 110.4 to 110.7, which are allocated to the radio device as a whole is suitable for distinguishing the radio device from at least one other radio device of a group of radio devices, to which the radio device 100 belongs. In other words, there is at least one parameter comprised in the set 110.4 to 110.7, which enables such distinction. In some embodiments, more than one parameter is provided for distinction from other radio devices. This way, an organization of a group of radio devices into subgroups, -sub-subgroups or any other desired structure is made possible. Of course, such grouping may also be achieved on the basis of one parameter with a predefined data structure allowing the identification of the group, subgroup, etc., to which the respective radio device belongs.

Operation of the radio device 100 will be explained in the following with reference to FIG. 2. The method starts with a step S200. In a subsequent step S202, the application unit 108 generates application output data. The application output data may be stored in the memory 110 for retrieving them later. In a step S204, the application scheduling unit 106 performs a scheduling operation that determines a time for transmission of the generated application output data via the transmission unit 102. The scheduling is performed using the predetermined application transmission schedule stored in the memory 110. In a subsequent step S206, a transmission of the application output data generated by the application unit 108 is initiated by the application scheduling unit 106 and the transmission unit 102 transmits the application output data via the associated radio access network. In the described process flow, the scheduling and the initiation of the transmission of the application output data is performed by the application scheduling unit. The step of generating application output data (S202) is performed by the application unit 108 and is thus not a mandatory step for the operation of a radio device in accordance with the present invention. For a radio device in accordance with the present invention, it is sufficient in some embodiments to simply perform the scheduling and the initiation of the transmission and, of course, the actual transmission of the application output data.

After the transmission has been performed, the radio device may either be shut down to stop the process flow (step S210), or return to the generation of application output data in step S202. It is noted that the generation of application output data may be performed independently and in parallel to the scheduling and transmission operations.

Figure 2:
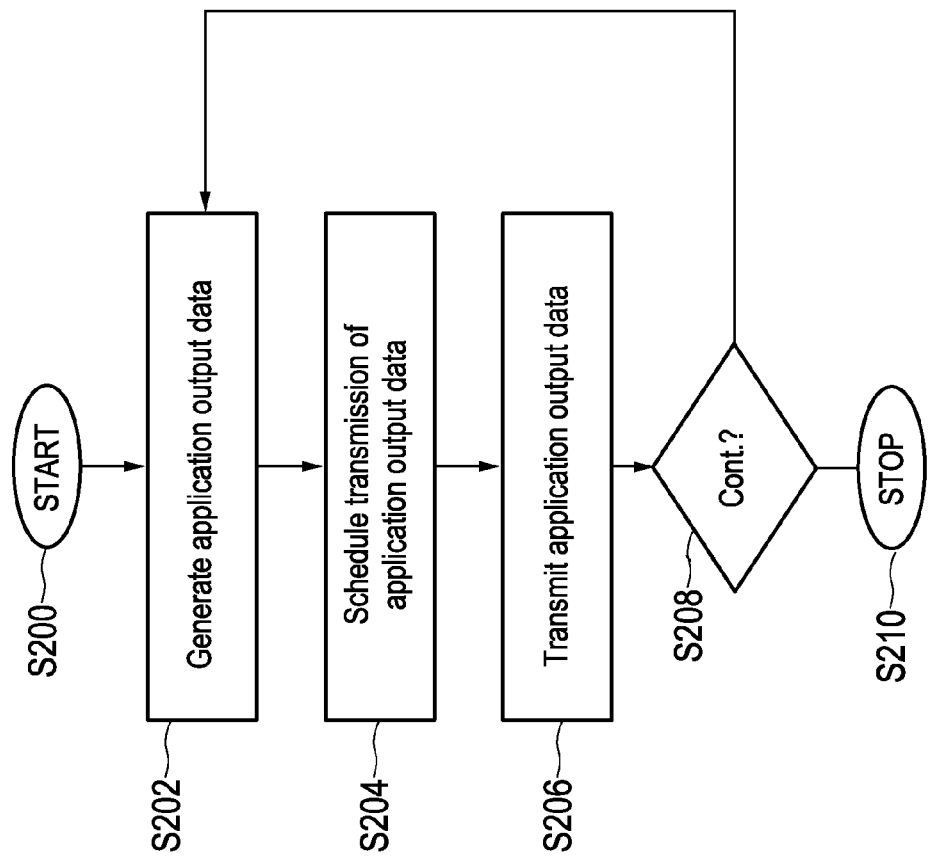

The process flow of FIG. 2 may be extended by a communication with an external application server that provides control signals for adapting the application transmission schedule. Thus, before the scheduling step S204, a step of receiving control information from the external application server may be performed. This step may also be performed at any other position in the process flow shown in FIG. 2. The received control information influence the scheduling of the transmission of application output data at the next time, this step S204 is performed.

Figure 3A:
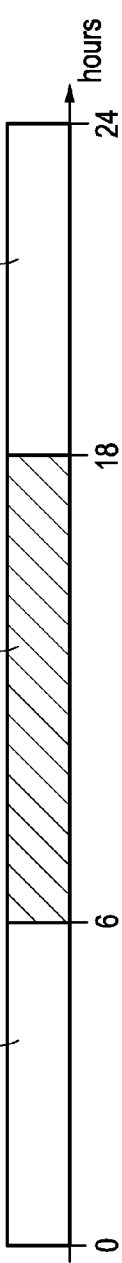

FIG. 3a) to c) show examples of application transmission schedules in accordance with different embodiments. The application transmission schedules shown in FIG. 3a) to c) are visualized as diagrams showing allowed and forbidden times on a linear time scale extending over one day. FIG. 3c) shows a section of the application transmission schedule of FIG. 3b) at an enlarged timescale. Throughout FIG. 3a) to c) forbidden times are indicated by hatching. FIG. 3a) is an example of an application transmission schedule that restricts the allowed times to the hours between 0 and 6 o'clock, and 18 to 24 o'clock. An application transmission schedule of this type may be refined by additional parameters that further individualize the application transmission schedule, possibly down to the level of an individual radio device. A schedule of the type of FIG. 3a) is typically assigned to a group of radio devices. It may be defined by a scheduling parameter that encodes the allowed time spans in terms of their starting and end points in time.

Figure 3B:
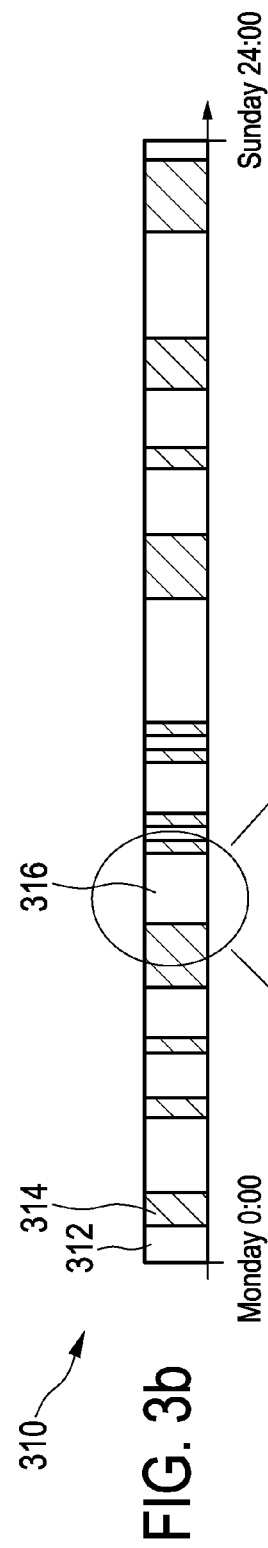
Figure 3C:
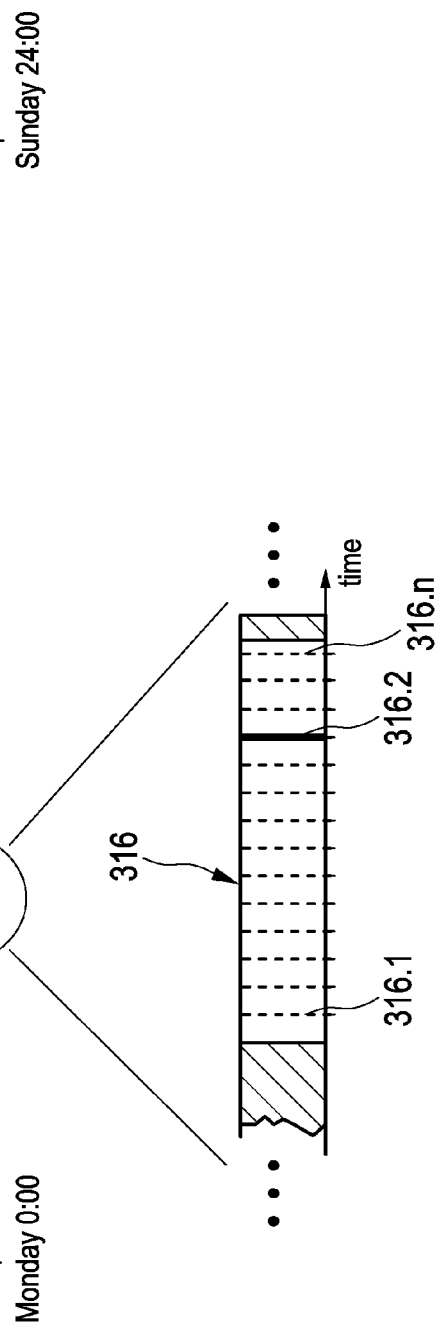

A more refined application transmission schedule is shown in FIG. 3b). This application transmission schedule 310 of FIG. 3b) distinguishes between numerous allowed time spans 312 and forbidden time spans throughout the days of a full week. Radio devices operating on the basis of the application transmission schedule 310 may transmit their application output data to the application server only during the allowed time spans 312. Certain times of the week are locked by defining forbidden time spans, for instance in order to allow the application server to perform tasks different from receiving and processing the application output data.

FIG. 3c) shows an allowed time on an enlarged time scale for visualizing a possibility to further distribute the transmission times based on parameters allocated to the individual radio devices. The allowed time 316 has a number of dashed marks 316.1 to 316.n which represent transmission times that are determined for different individual device on the basis of their respective application transmission schedules. The application transmission schedules of this example distinguish the transmission times on the basis of the individual radio device, thus prescribing an access to the radio access network for a transmission attempt at respective individual times. The application transmission schedule may be defined in a way that allows several attempts per individual radio device during a single allowed time 316. For the present example, the scheduled time for the transmission of application output data by the radio device 100 of FIG. 1 is indicated by a full vertical line 316.2 on the timescale of FIG. 3c). An individual transmission time of this kind may be determined on the basis of a parameter that is unique for each radio device. A suitable parameter of this kind is the IMEI of the radio device. An example calculation rule that determines an application transmission schedule on the basis of the IMEI is for example: Full hour+[(modulo 6 of IMEI)×30 minutes].

An application transmission schedule of this kind can be stored as a calculation rule in the memory 110 of the radio device 100 and used for determining the times of transmission by calculation, which is performed by the application scheduling unit. By a calculation rule of this type, the radio load of the cell, to which the group of radio devices is attached, is distributed in time. This way, peaks of cell usage by M2M communication can be avoided and the capacity of the cell of the radio access network is more evenly used, allowing to serve a larger number of radio devices at a given point in time.

Figure 4B:
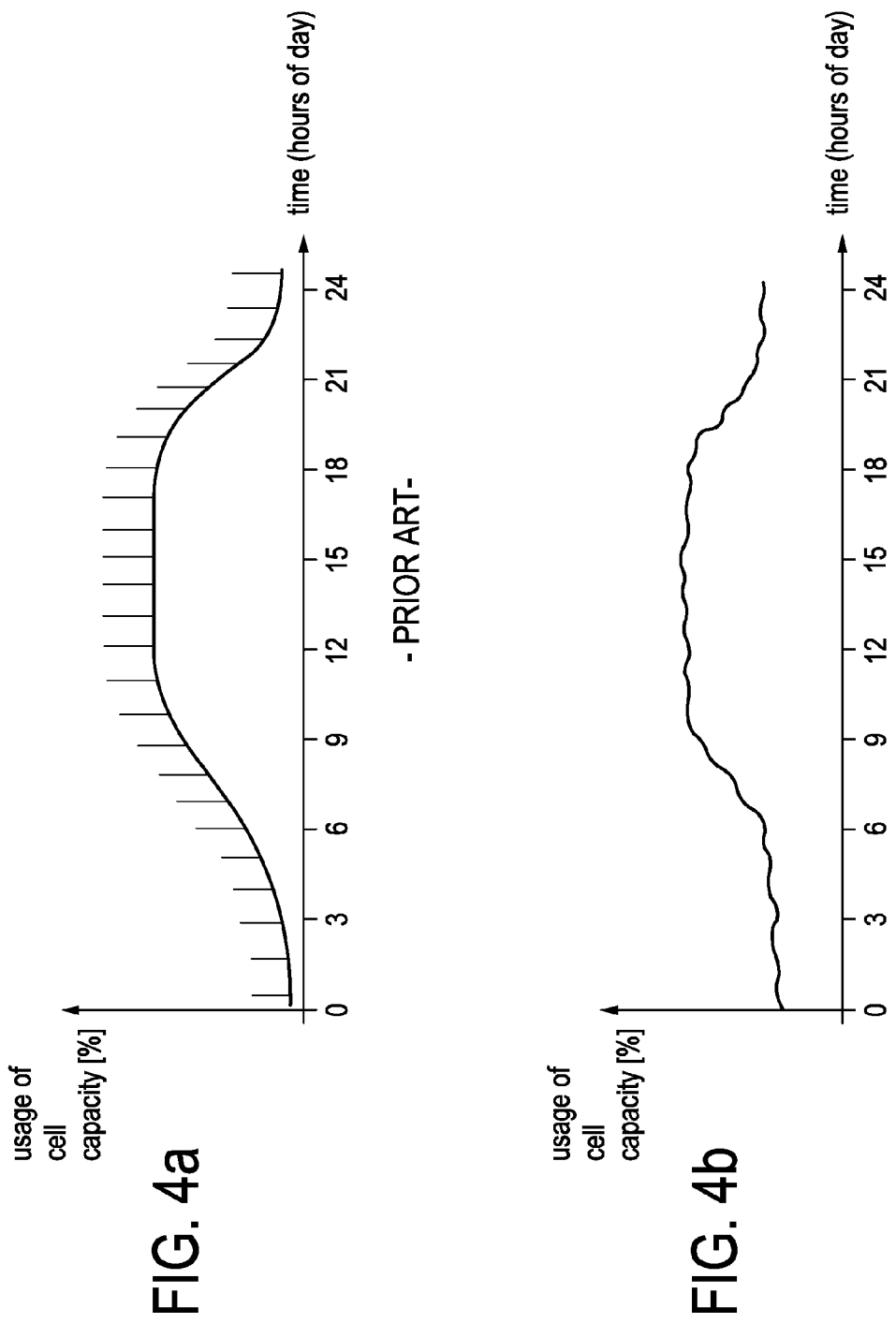

FIG. 4 visualizes this effect by two schematic drawings showing the usage of a transmission capacity of a cell of a radio access network as a function of time over a full day. FIG. 4a) shows a case of cell usage based on prior-art techniques. In this example, a peak of the used capacity occurs at every full hour due to a large group of radio devices performing scheduled transmissions of application output data in accordance with a prescribed application transmission schedule according to the prior art. In contrast, the distribution of the usage of the cell capacity is more evenly in the example of FIG. 4b) which is based on a shift of transmission times from busy hours to less busy hours during the night times, and more evenly distributed by an individual assignment of the application transmission schedule based on a device parameter that is unique for each radio device.

Figure 5:
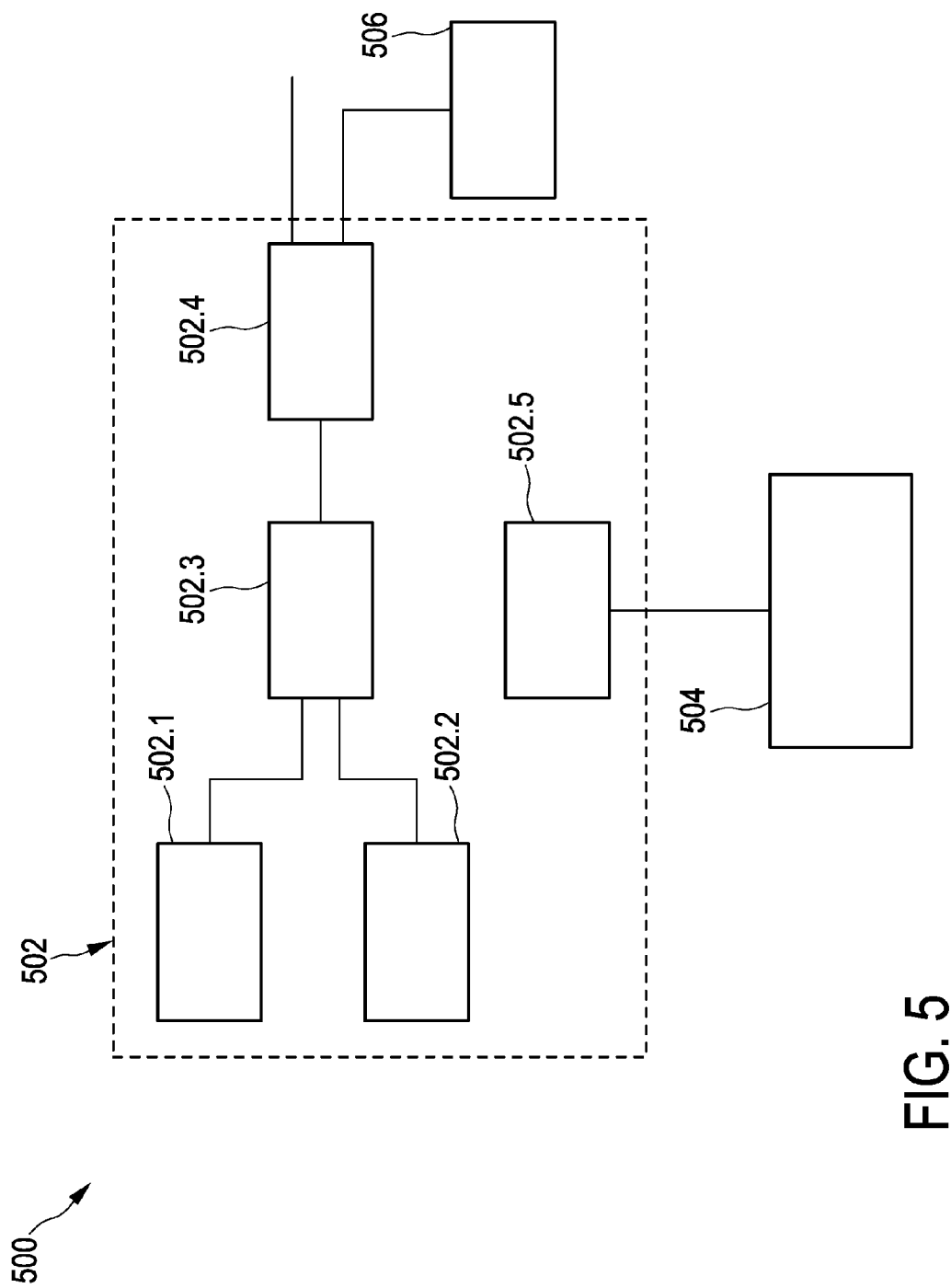

FIG. 5 shows a schematic block diagram of a controller device 500 for controlling a traffic of application output data transmitted from a predefined group of radio devices to an application server in a radio access network. The controller device comprises a scheduling unit 502 and an output unit 504. The scheduling unit is further connected to an overload detection unit 506. The scheduling unit comprises a device database 502.1 which stores information on one or more groups of radio devices to be controlled by the controller device. The data base may be fed by an application provider, which is responsible for the group of radio devices in the context of an application. For instance, a provider of metering devices for electricity may feed the device data base 502.1 with identifications of radio devices that are to be controlled by controller 500. The radio devices may be identified by way of their IMEI, and/or by way of an application specific identification number, for instance a serial number assigned by the application provider. Furthermore, the controller device comprises a schedule data base 502.2, which stores information on a number of application transmission schedule templates. The application transmission schedule templates may be provided in the form of tables or in the form of calculation rules or any other form that allows a determination of an application transmission schedule by either the controller device itself or by a radio device. The scheduling unit 502 further comprises a schedule selection unit 502.3, which is connected with the device data base 502.1 and the schedule data base 502.2. The schedule selection unit is connected with an input unit 502.4, through which the controller device 500 receives input information. The input information may provide information on associated radio device that are to be controlled, on application transmission schedules that are to be selected, or on a current status of a radio access network or on a load situation of an associated application server. A schedule assignment unit 502.5 that is connected with the schedule selection unit and the device data base serves for distributing selected application transmission schedules or corresponding information that allows associated radio devices to determine respective application transmission schedules to the associated radio devices. To this end, the corresponding information is forwarded to the output unit together with information required for addressing the respective radio devices. The addressing may be on an individual basis or on the basis of a group identifier that applies to a plurality of radio devices. As such, the output unit 504 may transmit the corresponding information on application transmission schedules via a unicast, modicast or broadcast transmission. As an option, an overload detection unit may be additionally implemented in the controller device.

Figure 6:
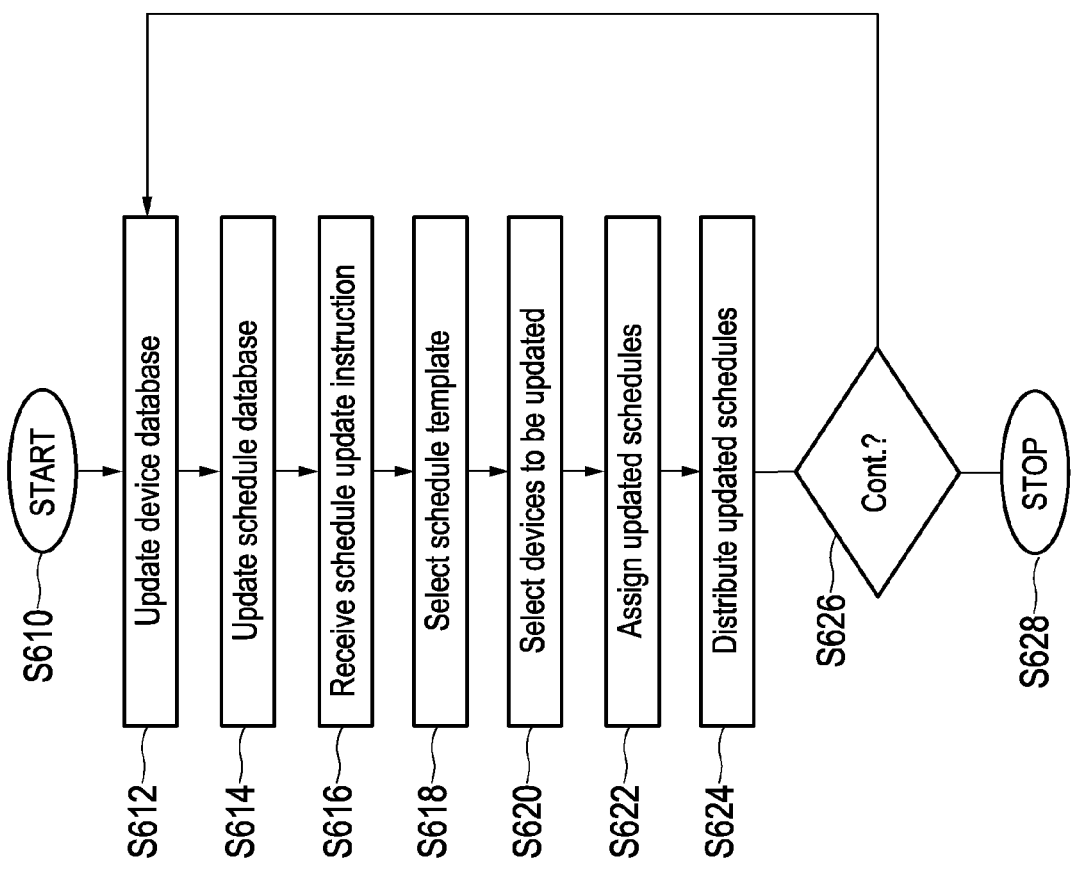
FIG. 6 is a schematic flow diagram that shows an embodiment of a method for operating a controller device such as that of FIG. 5.

Operation of the controller device is further exemplified by way of the flow diagram shown in FIG. 6. FIG. 6 is a schematic flow diagram that shows an embodiment of a method for operating a controller device such as that of FIG. 5. The process starts at a step S610. With a step S612, the controller devices checks for existing update information regarding the device data base 502.1. In case such information exists, the data base is updated accordingly. An update may for instance be provided to the controller device by an application server that administrates a certain group of radio devices and may for instance add new devices or cancel other devices from the device data base 502.1. In a subsequent step S614, the controller device checks for existing update information regarding the schedule data base 502.2 in case such update information exists, the schedule data base 502.2 is updated accordingly. An update of the schedule data base may for instance be triggered by an application provider that wishes to change the application transmission schedules of application devices allocated to its application service. In step S616, the controller device checks for existing schedule update instruction. Schedule update instructions may be received from external devices that have detected a situation, which requires an adaptation of the application transmission schedules of associated application devices. In another embodiment, the controller device detects overload situations, for instance in the radio access network or at the application server, and generates schedule update instructions by its own means. Based on the received schedule update instruction, the controller device subsequently selects one or more application transmission schedule templates. The selection is based either on received specific instructions identifying the schedule template to be selected or on intermediate processing performed by the controller device received status information. After selecting the appropriate schedule template for the update in step S618, the controller device selects the devices that are to be provided with an updated application transmission schedule in step S620. The devices may for instance also be selected in accordance with their respective allocations to certain groups. Based on this step, the updated schedules or corresponding information is put together and assigned to the respective application devices, using the information provided in the device data base 502.1 for a correct addressing of the respective devices. Finally, the updated schedule information is distributed to the destination radio devices in step S624. The process may be performed repeatedly as indicated in FIG. 6, by branching back to step S612. The process may of course also be repeated at certain predetermined times, or may be triggered upon request from an external unit such as an application server or an application administrator. The controller device may be implemented as a unit of an application server or another administrative device operated by a provider of an application service. In another embodiment, the controller device is operated by a provider of a radio network infrastructure used by the application devices.

Figure 7:
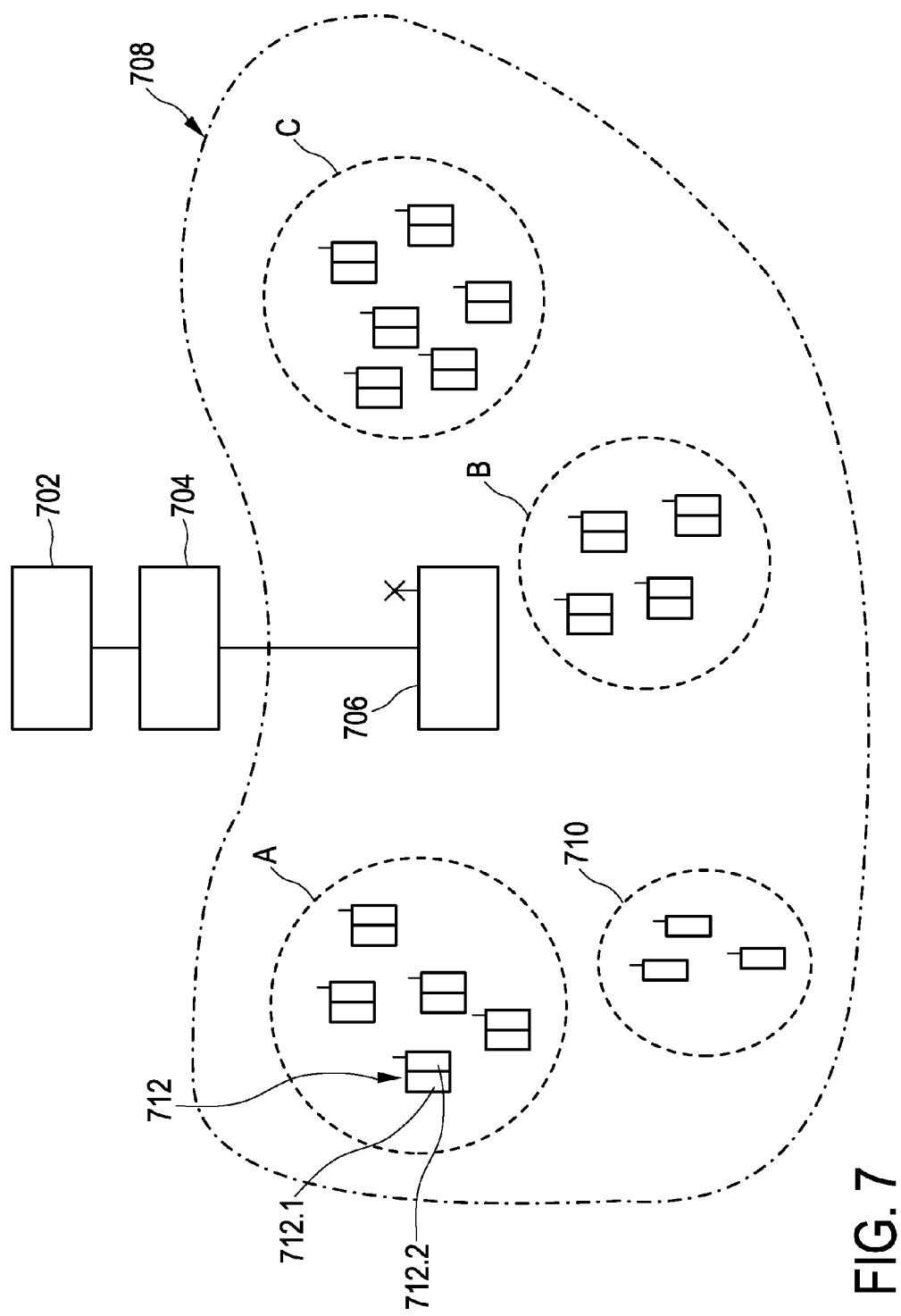
FIG. 7 shows a schematic visualization of an arrangement of application devices and network, controller and server infrastructure used to implement an application service in accordance with the present invention.

FIG. 7 shows a schematic visualization of an arrangement of application devices and network, controller and server infrastructure used to implement an application service in accordance with the present invention. An application server 702 is connected with a controller device 704, which is in communicative connection with base station 706 of a cellular radio access network. The base station 706 provides attached radio devices in a cell 708 with radio signals for communication. The radio devices attached to base station 706 in the cell 708 are divided into several groups. First, there are mobile telephones summarized by reference label 710. The mobile telephones 710 are outside the scope of the present description. They perform mobile communication using base station 706 in accordance with the requirements of their users. On the other hand, there is a number of application devices, which is attached to the base station 706. The application devices are for instance metering devices that measure the energy consumption of households in the coverage area of the cell 708. The application devices comprise a respective metering unit and a radio module. This is indicated by way of example in application device 712. The application device 712 is an embodiment of a radio device according to the first aspect of the present invention. It has a metering unit 712.1 forming an application unit in the sense of embodiments described herein above, and a radio module 712.2. The radio module 712.2 is used for radio communication with the base station 706. The metering unit 712.1 and the radio module 712.2 are connected via an internal interface and may for instance communicate by an exchange of AT commands. However, other means and protocols of communication may be used. The application devices 712 are grouped into three subgroups A, B and C. This grouping corresponds to a distinction of device parameters that are assigned to the respective application devices in groups A, B and C. The controller device 704 has corresponding entries in its device data base. In accordance with respective application transmission schedules that are assigned to the subgroups A, B and C, the devices of the corresponding subgroups will transmit their application output data i.e. energy consumption data of respective households, to the application server 702, using radio communication via base station 706. The application transmission schedules between the application devices of different subgroups differ from each other. This allows achieving a first type of distribution of transmission times, which helps avoiding peak usage of a radio cell. Furthermore, the individual application devices can be assigned application transmission schedules that further distinguish the transmission times in dependence on the IMEI of the radio devices. This way, a fine distribution of transmission times can be achieved to further differentiate transmission times between each and every application device.

In summary, the above examples show that by use of the present invention, it is possible to distribute the times of transmission of application output data via a radio access network by means of distinguished application transmission schedules. These application transmission schedules may be determined by the application devices themselves, or they may be assigned by a controller device. The achieved distribution of the transmission times helps avoiding situations of peak usage of the limited capacity of a radio access network or peak load situations at an application server that receives the application output data and processes them.

The invention claimed is:

1. A radio device, comprising
an application scheduling unit, which is configured to
initiate a radio network access for a transmission of application output data in communication with a radio access network in accordance with a predetermined application transmission schedule determining at least one allowed time, which is a time span or a point in time and defined in terms of a week, a day or a time of day, for the communication of the application output data, wherein the at least one allowed time depends on a parameter value of a set of at least one parameter, wherein the application transmission schedule is determined by calculating the at least one allowed time according to a predetermined schedule-calculation rule that uses said at least one parameter,
  wherein the at least one parameter is allocated to the radio device and is suitable for distinguishing the radio device from at least one other radio device of a group of radio devices to which the radio device belongs, and the at least one parameter comprises a unique identification number allowing an unambiguous identification of the radio device, and
a communication unit, which is configured to either transmit or receive the application output data in communication with the radio access network in the form of radio signals and at a time that is in accordance with the predetermined application transmission schedule.

2. The radio device of claim 1, wherein the set of at least one parameter further comprises a group identifier, which identifies a group of radio devices, to which the radio device belongs.

3. The radio device of claim 1, comprising a receiving unit, which is configured to receive radio signals in communication with a network node of the radio access network, wherein the receiving unit is configured to receive at least one parameter value of the set of at least one parameter from the network node.

4. The radio device of claim 1, wherein the set of at least one parameter additionally comprises a load parameter, which is indicative of a current condition of the radio access network.

5. The radio device of claim 1, wherein the set of at least one parameter additionally comprises a scheduling parameter, which is indicative of a time constraint that further constrains the allowed time for the transmission of the application output data.

6. The radio device of claim 1, wherein the application scheduling unit is configured to control the radio device for transmission of the application output data at the at least one calculated allowed time.

7. The radio device of claim 1, further comprising a receiving unit, which is configured to receive radio signals in communication with a network node of the radio access network.

8. The radio device of claim 1, further comprising an application unit, which is connected with the application scheduling unit and which is configured to generate the application output data.

9. The radio device of claim 1, further comprising a memory, wherein the parameter value of the at least one parameter allocated to the radio device or the schedule-calculation rule is stored in the memory.

10. A controller device for controlling traffic of application output data communicated between a predefined group of radio devices and an application server in a radio access network, the controller device comprising
a scheduling unit, which is configured to determine respective parameter values of a set of at least one parameter to be allocated to the radio devices of the group for use in determining at least one schedule-calculation rule that uses the parameter values of the set of at least one parameter allocated to the radio device as a calculation input parameter for calculating the application transmission schedule,
  wherein the application transmission schedule determines at least one allowed time, which is a time span or a point in time and defined in terms of a week, a day or a time of day, for the transmission of the application output data, the allowed time depending on the parameter value of a set of at least one parameter that is allocated to the respective radio device of the group and that is suitable for distinguishing the radio device from at least one other radio device of the group;
an output unit, which is configured to provide the parameter values or the at least one schedule-calculation rule for distribution to the group of radio devices attached to the radio access network; and
an overload detection unit, which is configured to detect an overload condition at the application server and/or in the radio access network in accordance with at least one predefined overload criterion and, upon detecting the overload condition, provide at an output of the overload detection unit an indicator of the presence of the overload condition, wherein
the scheduling unit is configured to receive the indicator provided by the overload detection unit and is configured to generate and provide at an output of the scheduling unit overload control information instructing the radio devices, which are members of the group, to modify the application transmission schedule by modifying at least one of the parameter values of the respective set of at least one parameter that is allocated to the respective radio devices.

11. The controller device of claim 10, wherein the scheduling unit is configured to assign a unitary schedule-calculation rule to all radio devices of the group.

12. A method for operating a radio device, comprising
initiating a radio network access for a transmission of application output data in communication with a radio access network in accordance with a predetermined application transmission schedule determining at least one allowed time, which is a time span or a point in time and defined in terms of a week, a day or a time of day, for the transmission of the application output data, wherein the at least one allowed time depends on a parameter value of a set of at least one parameter, wherein the application transmission schedule is determined by calculating the at least one allowed time according to a predetermined schedule-calculation rule that uses said at least one parameter,
  wherein the at least one parameter is allocated to the radio device and is suitable for distinguishing the radio device from at least one other radio device of a group of radio devices to which the radio device belongs, and the at least one parameter comprises a unique identification number allowing an unambiguous identification of the radio device, and
transmitting the application output data in communication with the radio access network in the form of radio signals and in accordance with the predetermined application transmission schedule.

13. A non-transitory computer-readable medium encoded with a computer program comprising executable code for controlling operation of a radio device in accordance with a method of claim 12 when executed by a processor of the radio device.

14. A method for operating a controller device in controlling operation of a group of radio devices, comprising
scheduling a radio network access for a transmission of application output data in communication with a radio access network between the group of radio devices and an application server via a radio access network,
wherein the scheduling comprises providing all radio devices of the group with a predetermined application transmission schedule determining at least one allowed time, which is a time span or a point in time and defined in terms of a week, a day or a time of day, for the transmission of the application output data, wherein the respective allowed time depends on a parameter value of a set of at least one parameter that is allocated to the individual radio devices of the group, and
in response to detecting an overload condition at the application server and/or in the radio access network in accordance with at least one predefined overload criterion and upon detecting the overload condition, providing an indicator of the presence of the overload condition,
wherein the scheduling further comprises, upon receiving of the indicator, generating and providing overload control information instructing the radio devices, which are members of the group, to modify the application transmission schedule by modifying at least one of the parameter values of the respective set of at least one parameter that is allocated to the respective radio devices.

* * * * *